May 28, 1968  C. E. ELLIS  3,385,200

COOKER FOR GRAIN OR THE LIKE

Filed July 19, 1966

United States Patent Office 3,385,200
Patented May 28, 1968

1

3,385,200
COOKER FOR GRAIN OR THE LIKE
Clarence Eugene Ellis, Box 6, Red Rock, Okla. 74651
Filed July 19, 1966, Ser. No. 566,341
3 Claims. (Cl. 99—237)

ABSTRACT OF THE DISCLOSURE

A grain cooker which embodies a centrally arranged heating and steaming unit surrounded by a spaced exterior shell so as to provide passages for the downward movement of grain on opposite sides of the central unit. Grain is introduced near the top of the shell and removed near the bottom thereof in a continuous manner. Steam injection means deriving steam from the central unit are located in the passages together with means for agitating the grain.

---

This invention relates to a cooker for grain or the like.

More particularly, the invention comprises a means for applying heat and moisture simultaneously to a granular product during a regulated continuous flow of the product through the invention apparatus.

A primary object of the invention is to provide a cooker of the above-mentioned character having a heating and steaming unit or boiler which is enclosed by an outer shell, there being a space between the outer shell and boiler allowing for a continuous flow of granular material therebetween, said material absorbing heat from the generating unit through the wall thereof, this heat being ordinarily wasted.

Another important object of the invention is to provide a grain cooking apparatus of the above-mentioned character which has novel and simplified means for injecting steam into the mass of grain within the space between the outer shell and boiler, the steam being derived from the boiler and entering the grain at a plurality of spaced points.

A further object is to provide a grain cooker having a novel feed and discharge device and agitating and leveling means, tending to maintain the cooker filled by a solid mass of grain at all times.

Other objects are to provide an apparatus of the above-mentioned character which is simplified in construction, reliable and economical to operate, easy to maintain and relatively inexpensive to build.

Other objects and advantages of the invention will become apparent during the course of the following detailed description.

Figure 1:
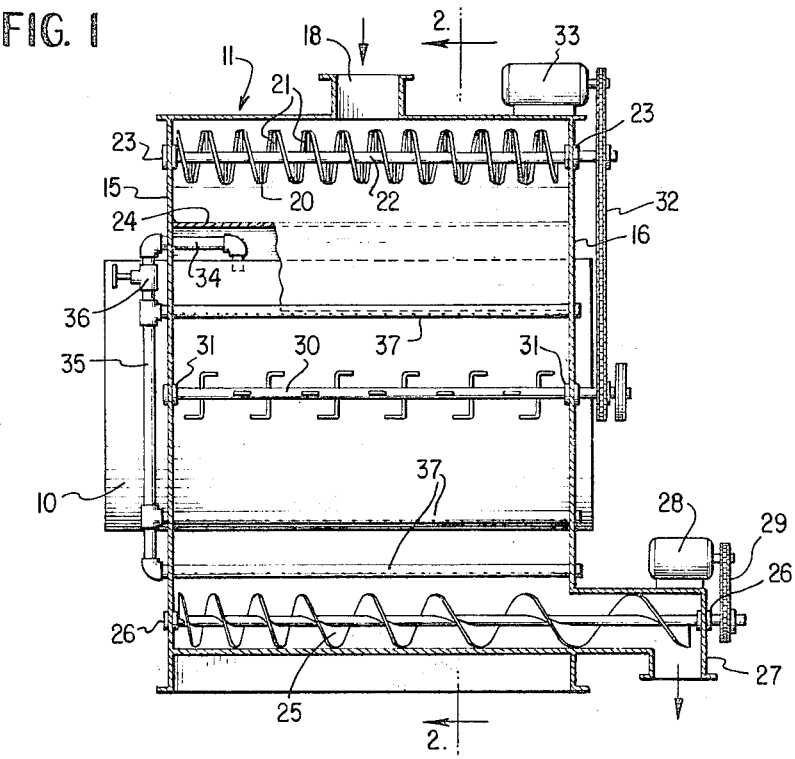
Figure 2:
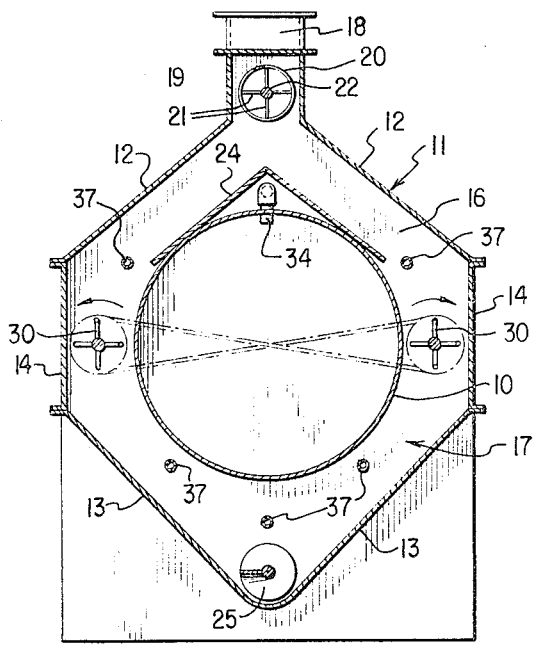

In the accompanying drawings forming a part of this application and in which like numerals are employed to designate like parts throughout the same, FIGURE 1 is a side elevational view of a grain cooking apparatus embodying the invention, with parts broken away and parts shown in section, and FIGURE 2 is a transverse vertical section taken on line 2—2 of FIGURE 1.

In the drawings, wherein for the purpose of illustration is shown a preferred embodiment of the invention, the numeral 10 designates a conventional horizontal steam boiler which is cylindrical, as shown. The boiler 10 is shown somewhat schematically in the drawings for the sake of simplicity and because various types of conventional boilers or steam generators may be employed for the invention. An electrically heated boiler with a self-contained heating element could be used, or a gas fired boiler could be used, if preferred. Steam could obviously be piped into the boiler chamber from a remote source. Means for supplying water to the boiler can be entirely conventional and need not be shown for a proper understanding of the invention. In any case, the boiler or generator 10 serves as a heating and steaming unit for the grain being treated in the apparatus. Surrounding the boiler and supporting the same is an outer shell 11, preferably formed in sections as shown in FIGURE 2, including top section having inclined upwardly converging walls 12, a bottom section having downwardly converging inclined walls 13 and vertical side walls 14, all suitably connected into a rigid unit. The outer shell 11 also includes vertical end walls 15 and 16 suitably secured to the other sections of the outer shell 11 and unitized therewith.

As shown, the boiler 10 is supported within openings in the end walls 15 and 16 and extends entirely through the outer shell 11 lengthwise. The boiler is arranged in centered spaced relation to the walls 12, 13 and 14 so that an open passage or chamber 17 of considerable width is provided between the boiler 10 and the outer shell 11. As will be explained, this passage is normally filled with the granular material being treated during the operation of the cooker.

The upper section of the shell 11 has a granular material inlet 18, preferably at its longitudinal center through which grain or the like from a source flows into the chamber 17. In order to continuously level off the grain in the chamber 17, there is provided within a top extension 19 thereof an auger-like rotary leveling element consisting of a spiral rod 20 supported by spaced spokes 21 arranged at intervals along the spiral rod and connected with a center rotary shaft 22, journaled in bearings 23 on the end walls 15 and 16. As shown, the leveling element extends for the entire length of the shell 11 and its action during rotation continuously levels the grain in the chamber 17 and helps in distributing the incoming grain and in maintaining an even flow of grain downwardly through both sides of the chamber 17.

An abrasion shield 24 is suitably fixedly mounted upon the top of the boiler 10 and extends between the end walls 15 and 16 and has its sides parallel to the walls 12. This shield protects the top of the boiler 10 from the constant abrasive effect of the grain passing downwardly at both sides of the boiler. Within the bottom of the outer shell directly opposite the spiral leveling element 21 is a horizontal graduated pitch discharge auger 25 having its shaft journaled in bearings 26 as shown in FIGURE 1. This auger feeds and discharges grain from all points along the bottom of the chamber 17 to a grain outlet 27 spaced from one end of the apparatus. The auger 25 is driven by a motor 28 and variable speed gearing 29, as shown in the drawings.

At the opposite sides of the boiler 10 and within the vertical portions of the chamber 17 are rotary agitators 30, whose shafts are also journaled in bearings 31 on the end walls 15 and 16. Each agitator has a multiplicity of L-shaped agitator fingers mounted thereon in longitudinally and circumferentially spaced relation. The agitators work to continually loosen the grain and prevent excessive packing up of the grain within the chamber 17 during operation. Both agitators 30 and the rotary leveler having shaft 22 are driven by suitable gearing 32 from a motor 33 at the top of the apparatus. The agitators turn in the direction of the arrows in FIGURE 2.

Means is provided to inject steam from the boiler 10 into the mass of grain at a plurality of spaced regions in the chamber 17. This means comprises a steam bleed-off pipe 34 communicating with the top of the boiler and leading to a vertical pipe 35 outside of the shell 11 having a valve 36 therein for control of the steam. Perforated branch pipes 37 lead from the pipe 35 into and through the chamber 17. The spacing of the perforated pipes 37 is shown in FIGURE 2 so as to distribute moisture most advantageously through the grain. A pair of the pipes 37 may be arranged above the agitators 30 and three more perforated pipes surrounding the bottom portion of the boiler. The arrangement and number of perforated pipes for injecting steam into the grain may be varied within the scope of the invention.

During operation, the chamber or space 17 is entirely filled with grain and the device 21 maintains the top of the grain mass level while the auger 25 continuously discharges the cooked grain from the outlet 27. The agitators 30 prevent clogging of the apparatus and gravity also aids in the continuous flow of grain through the chamber 17 on both sides of the boiler. Cooking heat is continuously derived from the boiler and steam is injected into the material in the quantity desired. The operation may be continuous and is most efficient.

It is to be understood that the form of the invention herewith shown and described is to be taken as a preferred example of the same, and that various changes in the shape, size and arrangement of parts may be resorted to, without departing from the spirit of the invention or scope of the subjoined claims.

What is claimed is:

1. A grain or like material treating apparatus comprising a centrally arranged heating and steaming unit including a steam chamber having a substantially horizontal axis cylindrical side wall, an exterior shell surrounding and substantially enclosing said heating and steaming unit and spaced therefrom and defining therewith a cooking chamber substantially entirely around said unit, a top grain inlet opening means on the shell leading into the top of the cooking chamber substantially at the lateral center of the shell and said heating and steaming unit, a rotary auger-like grain distributing and leveling element in the top portion of the cooking chamber with its rotational axis substantially parallel to the axis of said unit and maintaining an even and substantially equal flow of grain downwardly in the cooking chamber on opposite sides of the heating and steaming unit, a bottom substantially horizontal axis auger discharge conveyor element for cooked grain in the bottom portion of the cooking chamber substantially at the lateral center of the cooking chamber and said unit, rotary agitator devices within the cooking chamber on opposite sides of said unit and extending substantially horizontally for the full horizontal length of the cooking chamber and continuously agitating the grain flowing downwardly on opposite sides of the heating and steaming unit, and a plurality of perforated steam injection pipes within the cooking chamber in surrounding relation to the heating and steaming unit and spaced therefrom and from said shell, said steam injection pipes extending substantially horizontally in the cooking chamber for substantially the entire horizontal length of the cooking chamber, and additional pipe means connected with said steam injection pipes and leading to the interior of said heating and steaming unit and delivering steam from said unit to said injection pipes.

2. A grain or like material treating apparatus as defined by claim 1, and wherein said exterior shell includes upper wall sections which are inclined and converge upwardly to said top grain inlet opening means, and lower wall sections which are inclined and converge downwardly toward said bottom auger conveyor element, said upper and lower inclined wall sections joined on opposite sides of the cylindrical unit by substantially vertical wall sections, and an inverted V-shaped grain shield and deflector on the top of said unit having walls approximately parallel to the upper inclined wall sections and having an apex directly below said auger-like distributing and leveling element and being substantially coextensive in length with the distributing and leveling element.

3. A grain or like material treating apparatus as defined by claim 2 and wherein said plural steam injection pipes includes at least a pair of pipes disposed above the rotary agitator devices and at least a pair of pipes below the agitator devices.

References Cited

UNITED STATES PATENTS

| | | | |
|---|---|---|---|
| Re. 23,777 | 1/1954 | Robinson | 165—154 XR |
| 338,673 | 3/1886 | Mowrer | 165—109 |
| 805,652 | 11/1905 | Leperche et al. | 99—263 XR |
| 839,322 | 12/1906 | Rock et al. | |
| 1,574,210 | 2/1926 | Spaulding. | |
| 1,888,472 | 11/1932 | Rohde. | |
| 2,576,177 | 11/1951 | Herr. | |
| 2,746,375 | 5/1956 | Abbott et al. | 99—263 |
| 2,824,721 | 2/1958 | Hill | 99—236 XR |
| 3,016,893 | 1/1962 | Brown | 165—154 XR |

WALTER A. SCHEEL, *Primary Examiner.*

J. M. NEARY, *Assistant Examiner.*